Patented Nov. 19, 1940

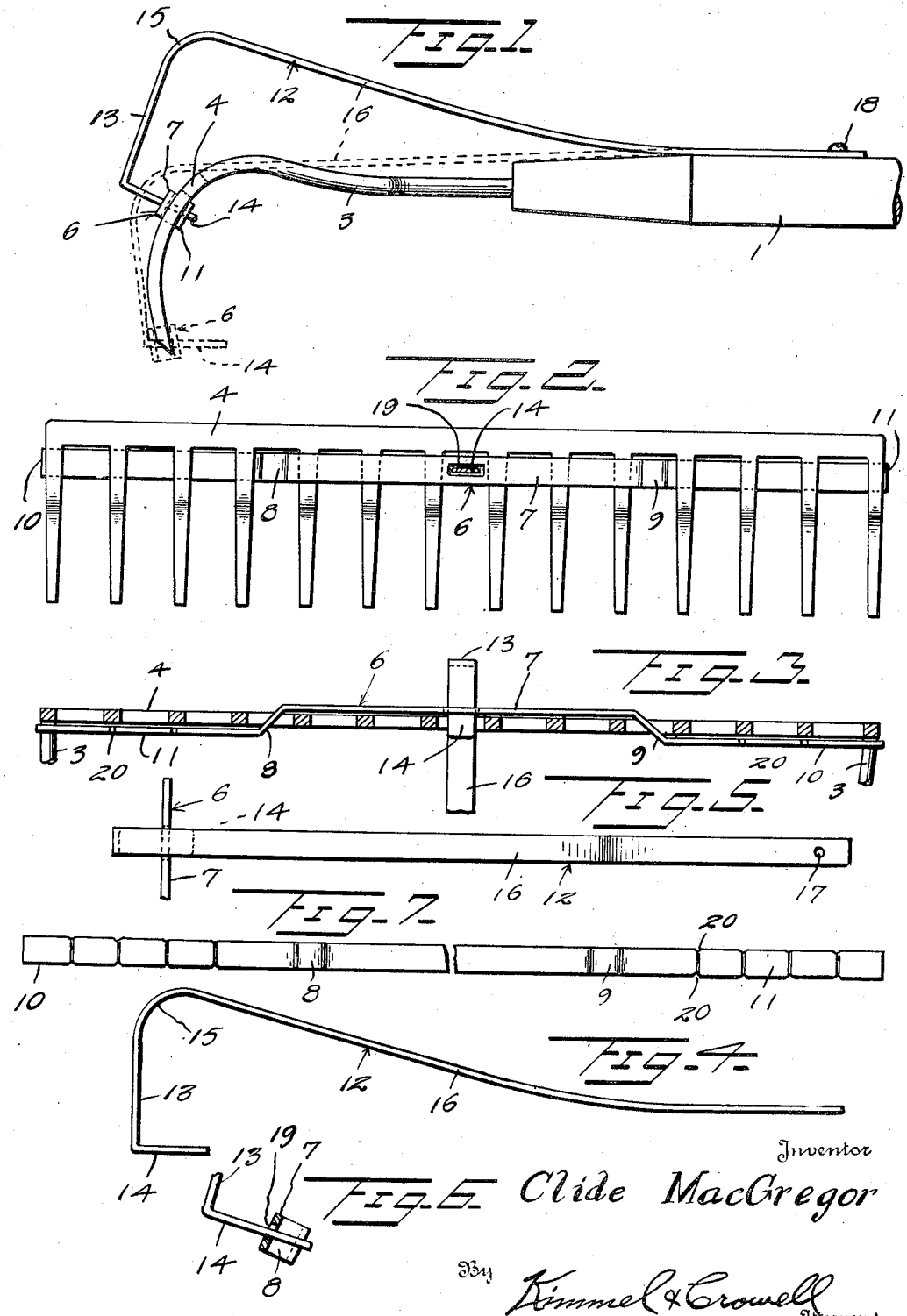

2,222,566

UNITED STATES PATENT OFFICE 2,222,566

STRIPPER ATTACHMENT FOR RAKES

Clide MacGregor, Flint, Mich., assignor of twenty-five percent to Roy C. Judy, Flushing, Mich.

Application May 1, 1939, Serial No. 271,188

1 Claim. (Cl. 56—400)

This invention relates to a stripper attachment for rakes.

The object of the invention is to provide, in a manner as hereinafter set forth a spring controlled stripper attachment capable of being readily installed with a rake without changing the construction of the latter and including a depressible spring element functioning when depressed to make the attachment active and when in non-depressed position holding the attachment in inactive position.

A further object of the invention is to provide, in a manner as hereinafter set forth a stripper attachment for rakes including a stripper bar formed in a manner to enable it to be arranged in operative relation with respect to the teeth of the rake without projecting to a material extent from the end teeth of the rake.

Further objects of the invention are to provide, in a manner as hereinafter set forth a stripper attachment for rakes which is comparatively simple in its construction and arrangement, strong, durable, compact, thoroughly efficient in its use, conveniently installed with respect to the handle and teeth of the rake, readily assembled and comparatively inexpensive to manufacture.

Embodying the objects aforesaid, and others which may hereinafter appear, the invention consists of the novel construction, combination and arrangement of parts as will be more specifically referred to and illustrated in the accompanying drawing, wherein is shown an embodiment of the invention, but it is to be understood that changes, variations and modifications may be resorted to which fall within the scope of the invention as claimed.

In the drawing:

Figure 1 is a side elevation of a rake showing the adaptation therewith of the stripper attachment in accordance with this invention. The attachment is shown in full lines in inactive position and in dotted lines in active position, Figure 2 is a front elevation showing the rake head, a stripper bar, forming an element of the attachment as applied to the teeth of the rake head, a controlling spring, forming another element of the attachment for the stripper bar and with the controlling spring shown in section, Figure 3 is an inverted fragmentary view looking towards the bottom edge of the stripper bar as applied to the teeth of the rake head, with the teeth of the latter shown in section and with the controlling spring in inverted plan, Figure 4 is an elevation looking towards one side edge of the controlling spring of the attachment prior to the arrangement of the spring relative to the stripper bar and rake, Figure 5 is a top plan view illustrating the controlling spring for the stripper bar and a fragmentary portion of said bar, Figure 6 is a fragmentary view illustrating a portion of the controlling spring looking towards a side edge thereof and further illustrating a cross section of the stripper bar, Figure 7 is a front elevation, broken away of the stripper bar prior to the reducing of the length thereof for installation with the teeth of a rake.

Referring to the drawing, 1 indicates a rake handle having extending from one end thereof a two-part shank 3 which merges into the ends of a coupling piece or head 4 for a series or gang of spaced teeth 5. The teeth 5 are shown of curved contour and with the curve directed forwardly.

The attachment with reference to Figures 1, 2 and 3 includes a stripper bar 6 formed from a strap-like piece of metallic material of the desired thickness and length. The bar 6 includes a horizontally disposed central portion 7, a pair of rearwardly extending oppositely inwardly inclined intermediate portions 8, 9 and a pair of oppositely disposed horizontal end portions 10, 11. The length of portion 7 is greater than the length of the portions 10, 11. The length of the portions 8, 9 is less than the length of the portions 10, 11. The ends of the portion 7 merge into the outer ends of the portions 8, 9. The rear ends of the portions 8, 9 merge into the inner ends of the portions 10, 11. When the bar 6 is installed relative to the teeth 5 the portion 7 is arranged forwardly of several of the teeth 5, the portions 8, 9 extend rearwardly between pairs of the teeth 5 and the portions 10, 11 are arranged rearwardly of several of the teeth 5. It may be stated that the teeth are disposed in a manner to form what may be termed a central set and a pair of end sets. The portion 7 of bar 6 is arranged forwardly of the central set, the portions 10, 11 of the bar 6 are arranged rearwardly of the end sets, and the portions 8, 9 extend between the central set and the end sets. The bar 6 is arranged relatively to the teeth 5 for vertically moving thereon for the purpose of stripping the rake.

The attachment includes a controlling spring 12 which is adapted to be depressed to make the bar 6 active and when pressure is relieved from the spring 12, the latter lifts the bar 6 to the head 4 which connects the teeth 5. The spring 12 is of strap like form and it includes an upstanding straight front part 13 merging at its lower end into a rearwardly directed lower part 14 disposed at right angles to the part 13. The latter merges at its upper end into a rounded upper part 15 which at its rear merges into the forward end of a curved rear part 16. The part 16 is of greater length than any of the other parts and has formed therein in proximity to its rear terminus an opening 17. The spring 16 is secured to the handle 1 by a holdfast means 18 extending through the opening 17 and engaging in the handle 1.

When the spring 12 is secured to the handle 1, the part 13 is disposed downwardly at a forward inclination with respect to the vertical, the part 14 rearwardly at a downward inclination with respect to the horizontal, the part 15 upwardly at a rearward inclination and the part 16 rearwardly at a downward inclination with respect to the horizontal.

When spring 12 is secured to the handle 1, the parts 13, 16 are disposed at opposite inclinations. The part 14 of the spring 16 couples the latter to the bar 6, and for such purpose the portion 7 of bar 6 is formed centrally with a slot 19 which is disposed lengthwise of and is intersected by the longitudinal median and also by the transverse median of the portion 7, and through the slot 19 the part 13 slidably extends at an inclination.

When the attachment is secured to the rake and disposed in inactive position it will be as shown in full lines, Figure 1 and in such position the bar 6 is elevated. When pressure is applied to the part 16 of the spring 12, the latter is depressed and it causes the bar 6 to slide down the teeth 5 and strip the material carried thereby. When the attachment is moved to active position it will appear as shown in dotted lines of Figure 1. The length of part 13 of the spring 12 is such as to shift, when spring 12 is depressed the bar 6 to the lower end of the teeth 5. The portions 7, 10, 11 of bar 6 coact with the portions 8, 9 of the latter for connecting the bar to the teeth. The portion 7 of bar 6 constitutes a guide for the latter.

With reference to Figure 6, the bar 6 originally will be of greater length than the length of the series or gang of teeth of the rake and to provide whereby bar 6 will substantially correspond to the length of such series or gang, the side edges of the bar at the end terminal portions thereof are formed with spaced pairs of oppositely extending aligned notches 20 to permit of parts of the bar being broken away for the purpose of reducing the length of the bar or in other words to provide for the stripper bar being of a length corresponding substantially to the length of the series or gang of teeth.

What I claim is:

A stripper attachment for rakes comprising a stripper bar having a portion arranged forwardly of certain of the teeth of the rake and spaced portions arranged rearwardly of other teeth of the rake, a depressible controlling spring adapted to have one end secured to the handle of the rake and arranged over the teeth of the rake, said spring provided at its other end with a rearwardly extending part, and said part of said bar arranged forwardly of certain of the teeth of the rake being formed with a slot coacting with the said part of said spring for coupling the spring and said bar together whereby when the spring is depressed the bar will be carried therewith to strip the teeth.

CLIDE MacGREGOR.